United States Patent [19]

Chaivre

[11] 3,971,289

[45] *July 27, 1976

[54] WHEEL NUTS

[75] Inventor: Joseph W. Chaivre, Royal Oak, Mich.

[73] Assignee: Towne Robinson Fastener Company, Dearborn, Mich.

[ * ] Notice: The portion of the term of this patent subsequent to June 22, 1988, has been disclaimed.

[22] Filed: July 24, 1972

[21] Appl. No.: 274,364

Related U.S. Application Data

[60] Continuation of Ser. No. 69,816, Sept. 4, 1970, abandoned, which is a division of Ser. No. 825,330, May 16, 1969, Pat. No. 3,561,820.

[52] U.S. Cl. ................................................ 85/35
[51] Int. Cl.² ........................................ F16B 37/14
[58] Field of Search ........................................ 85/35

[56] References Cited
UNITED STATES PATENTS
3,585,900    6/1971    Chaivre ................................. 85/35

*Primary Examiner*—Roy D. Frazier
*Attorney, Agent, or Firm*—Krass & Young

[57] ABSTRACT

A capped hexagonal nut for wheel rims wherein the cap includes a skirt portion terminating in an annular shoulder and a radially inwardly projecting flange which grips the shank of the nut to maintain a longitudinal tension between the cap and nut. The top of the cap may be open to expose a decorative plastic disk.

3 Claims, 6 Drawing Figures

U.S. Patent  July 27, 1976  3,971,289
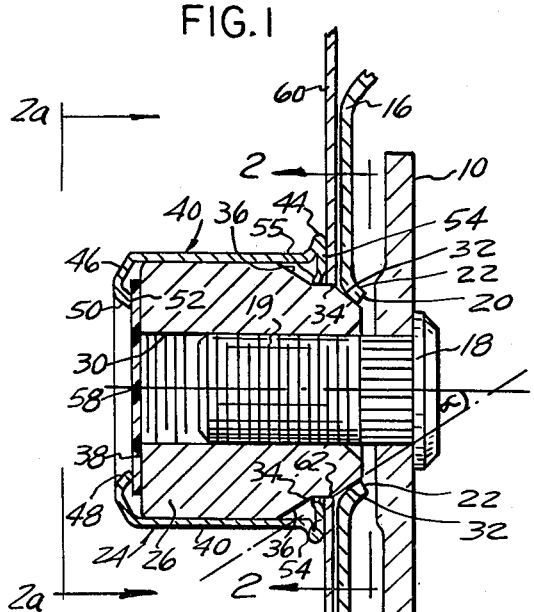
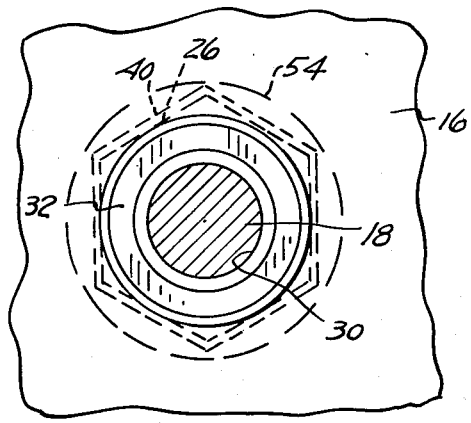
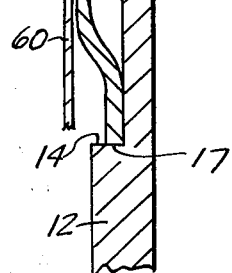
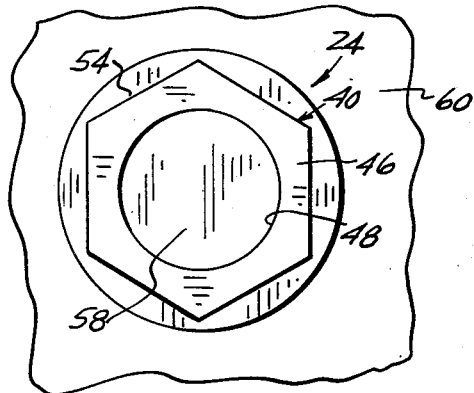
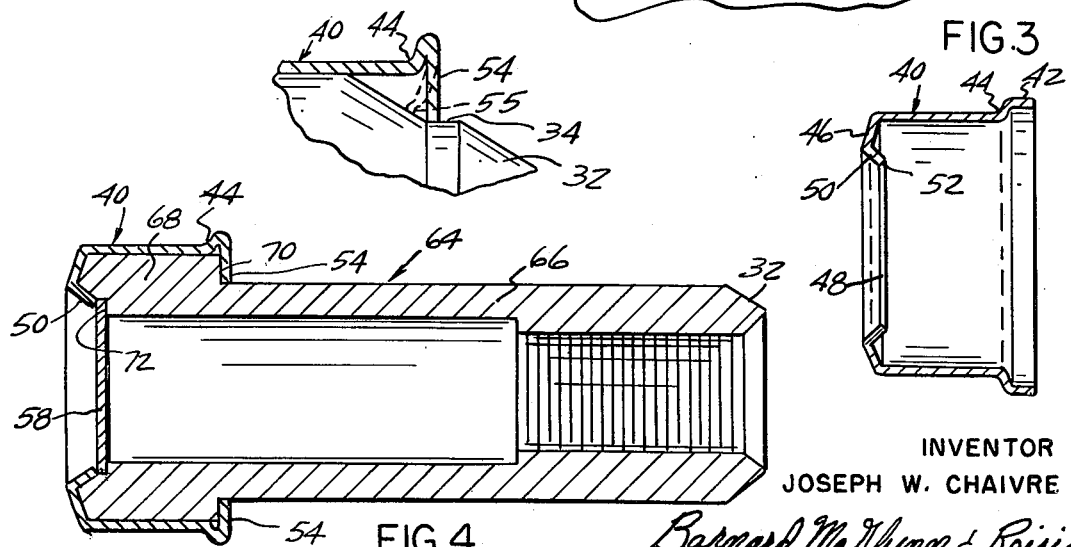
INVENTOR
JOSEPH W. CHAIVRE
Barnard, McGlynn & Reising
ATTORNEYS

WHEEL NUTS

This application is a continuation of application Ser. No. 69,816, filed Sept. 4, 1970, and now abandoned, which application is a division of application Ser. No. 825,330, filed May 16, 1969, and now U.S. Pat. No. 3,561,820.

INTRODUCTION

This invention relates to capped nuts of the type employed to secure automotive wheel rims to axle flanges.

It is well known to place a decorative cap of bright metal, for example, over a standard wheel nut to improve the appearance of an exposed nut wheel design. In many such capped nuts, a relatively loose fit between the cap and nut is provided, either as a result of initial fabrication or wear. This looseness may permit moisture to penetrate the space between the nut and cap, causing the nut to corrode. This is especially true in the case of caps having open tops to expose plastic disks.

It is an object of this invention to provide an aesthetically pleasing capped nut wherein the cap is firmly secured to the nut. In general, this is accomplished by forming the cap with a resilient portion on at least one end to engage the nut and provide a longitudinal tension in the cap maintaining it in tight engagement with the nut. In a preferred embodiment described herein, the cap is so formed as to have a skirt portion which overlies the flat peripheral nut faces and which terminates in an annular shoulder adjacent an inwardly projecting flange which engages the shank of the nut to provide the desired tension. As will also be described herein, the cap may be open at the top to expose a brightly colored plastic disk, the cap opening being so formed as to provide an inwardly projecting annular lip which affords longitudinal tension in the cap and tightly secures and seals the disk.

BRIEF DESCRIPTION OF THE DRAWINGS

The following detailed description refers to the attached drawings, in which the same reference numerals refer to similar parts throughout, and in which:

FIG. 1 is a cross section through a portion of a wheel and axle flange assembly showing the present improved wheel nut in position to secure a wheel and a wheel cover to the axle flange;

FIG. 1a is an enlarged fragmentary detail view showing the relationship between the cap flange and the surface of the nut;

FIG. 2 is a bottom plan view of the wheel and nut assembly shown in FIG. 1 as seen along line 2—2 thereof;

FIG. 2a is a top plan view of the wheel and nut assembly shown in FIG. 1 as seen along line 2a—2a thereof;

FIG. 3 is a separate cross sectional view of the cap used for the improved nut shown in FIGS. 1 and 2; and, FIG. 4 is another embodiment of an improved capped wheel nut constructed in accordance with the present invention.

DESCRIPTION OF THE PREFERRED EMBODIMENTS

With reference to FIGS. 1 through 3, the assembly in FIG. 1 comprises an axle flange 10 provided with a central hub portion 12 which forms a radial ledge or seat 14 adapted to support a wheel 16 in central position on the axle flange by means of a central wheel aperture 17.

In order to secure the wheel 16 on the axle flange 10, a plurality of wheel studs, one of which is shown at 18, are provided on the flange in radially spaced relation relative to the central hub portion 12. The wheel 16 is provided with a plurality of apertures, one of which is shown at 20, which number is identical to the number of wheel studs 18 for extension of each of the studs 18 through one of the apertures 20 when the wheel is assembled on the flange 10. The stud apertures 20 are formed with a conical depression 22 radially around the inner edge for a purpose to be described hereafter. This assembly as so far described is of conventional well known construction and need not further be shown or described in detail.

To secure the wheel 16 to the axle flange 10, a plurality of wheel nut assemblies 24 are provided, only one of which is shown in FIGS. 1 and 2. The wheel nut assembly 24 is of improved construction and comprises a nut 26 generally made of a low carbon steel. The body of the nut is preferably hexagonal in shape to provide a plurality of planar angularly disposed adjoining surfaces 28 adapted to be engaged by a socket wrench or the like for tightening or loosening of the nut. The nut 26 is provided with a central threaded aperture 30 adapted, in assembly, to engage the threads 19 of the wheel stud 18.

The lower end of the nut 26 is provided with a radial conical surface 32, which extends into a cylindrical land portion 34. Adjacent to the land portion 34, the radial outer surface of the nut is chamfered as at 36 preferably at an angle parallel to the angle of the conical surface 32. The top of the nut 26 is provided with a flat planar surface 38 centrally located around the threaded aperture 30.

A sheet or cap 40 covers the radial outer surface of the nut 26, which is preferably made of bright, polished, stainless steel to produce a shiny appearance. As described in more detail in Applicant's prior U.S. Pat. No. 3,364,806, the cap 40 is made of sheet metal preferably of a thickness of between 0.015 inches and 0.030 inches. As particularly noted in FIG. 3, the cap 40 is formed to closely match the contour of the nut 26 and the bottom end of the cap is provided with an increased diameter portion in the form of a skirt 42, which forms a radial shoulder 44 around the lower portion of the cap 40. The top 46 of the cap 40 is provided with a central aperture 48 formed by an inwardly directed depression in the shape of a conical rim 50. In the complete nut assembly as shown in FIG. 1, the cap 40 is drawn tightly over the nut body 26 so that, normally, the edge 52 of the conical rim 50 of the top aperture 48 of the cap abuts the planar top surface 38 of the nut. The skirt portion 42 of the cap is then crimped around the shoulder 44 to form a radial flange 54 having an internal radial edge 56, which, in assembly, as shown in FIG. 1, is adapted to be seated on the cylindrical land portion 34 of the nut between the conical end surface 32 and the chamfer 36. Normally, the flange 54 is disposed at a right angle to the radial suface of the cap 40, as will be seen from FIGS. 1 and 1a, whereby the flange 54 securely locks the cap 40 on the nut 26 so that the flange cannot move beyound the chamfer 36 of the nut.

In the complete wheel assembly as illustrated in FIG. 1, when the nut 26 is tightened on the stud 18 the conical end 32 of the nut is caused to engage the matched conical depression 22 of the wheel aperture 20. Due to the precision formed conical surfaces on the nut the wheel 16 will be accurately centered in relation to the seat 14 on the central hub 12 of the axle flange 10. When this is accomplished, the center line of the stud 18, wheel aperture 20, and nut 26 coincides with each other along a common axis "x". The chamfer or angle of the conical end surface 32 of the nut 26, as well as the matching surface of the conical depression 22 of the wheel aperture 20, are formed such as to be concentric with the axis x within 5 thousandths (0.005) of an inch, so that accurate centering of the wheel 16 will be assured upon tightening of the wheel nuts. As can best be seen in FIG. 1, the cap 40 is constructed such that the flange end will not interfere with the proper tightening of the nut and assures full engagement of the conical end 32 with the conical depression 22 of the wheel aperture 20.

With reference to FIGS. 1 and 1a and as herein specifically disclosed, the cap 40 of the nut assembly 24 is adapted to retain a disk or button 48 on top of the nut 26, which, in assembly, closes the cap aperture 48 and thereby simultaneously closes the threaded aperture 30 of the nut. In assembly, as shown in FIGS. 1 and 2, the disc 58 will be visible through the cap aperture 48 and for that reason is preferably colored so as to provide a pleasing appearance. The disk 58 is made from thin, flat sheet material and, although a synthetic material is preferred due to the ease of coloring, any other suitable material may be used.

The disk 58 is placed on the planar hub surface 38 of the nut prior to placing the cap 40 over the nut. After the cap 40 has been put in place, the flange 54 is formed to extend around the cylindrical land portion 34 of the nut and is then crimped as indicated at 55 in FIGS. 1 and 1a to, thus, securely lock the cap 40 to the nut 26. By means of crimping of the flange 54 on the nut 26, the cap 40 will be drawn downwardly upon the nut causing the edge 52 of the cap aperture to be depressed upon the disk 48, to thereby firmly lock and retain the disk on the flat top surface 38 of the nut. Thus, a tight sealing arrangement is provided between the disk and the nut assembly to prevent the entry of dirt and moisture into the nut.

With still further reference to FIGS. 1 and 1a, the improved wheel nut assembly 24 may advantageously be used as a wheel cover retention means by the provision of the cap flange 54. In this instance, the wheel cover indicated at 60 in FIG. 1, is provided with apertures 62, only one of which is shown, corresponding in number and radial spacing to the wheel apertures 20, and which have a diameter slightly larger than the diameter of the cylindrical land portion 34 of the nut so that, in assembly, the wheel cover 60 will be retained over the wheel 16 by means of the cap flange 54, as shown in FIG. 1. Normally, the wheel cover 60 is made of thin sheet metal and shaped like a convex disk having a radial edge (not shown) abutting against the wheel 16. Due to the convex shape, the wheel cover is somewhat flexible so that upon tightening of the nut assembly 24 the wheel cover will be securely attached to the wheel 16. As indicated more in detail in the enlarged portion shown in FIG. 1a, the cap flange 54 is likewise somewhat flexible so that when the nut assembly 24 is tightened upon the stud 18 against the wheel cover 60 the edge 56 of the cap flange will be slightly deflected inwardly of the cap against the chamfer 36 of the nut 26, as illustrated in broken lines in exaggerated proportion in FIG. 1a, to thereby provide a firm lock for the cap 40 and simultaneously to cause an even more tight clamping of the disk 58 upon the top 38 of the nut by means of the edge 52 of the aperture 48 of the cap.

FIG. 4 illustrates a further embodiment of a capped nut member, which, in this instance, comprises a long nut 64 having an internally threaded shank portion 66 extending into a hexagonal nut head 68. The junction of the hexagonal nut head with the shank portion provides a shoulder 70. The internal bore of the nut head is counterbored to provide a ridge 72 which is adapted to receive a disk 58. In assembly, the nut head 68 is capped with a cap 40 in a manner similar to the embodiment in FIG. 1, except that, in this instance, the radial flange 54 of the cap is adapted to abut against the shoulder 70 of the long nut to thereby firmly lock the cap 40 and disk 58 onto the nut head 68.

Thus, it is apparent from the foregoing description that by the present disclosure an improved capped wheel nut has been provided having means to securely retain a colored disc visible within the head of the nut and having resilient flange means to firmly lock the cap on the nut and assure a tight sealing engagement between the disk and the nut. Additionally, the cap flange may be utilized to retain a wheel cover.

The embodiments of the invention in which an exclusive property or privilege is claimed are defined as follows:

1. A capped wheel nut assembly comprising: a wheel nut having a plurality of flat peripheral faces and an axially extending shank portion of reduced diameter, a decorative cap of relatively thin sheet material having a skirt portion overlying the faces of the nut and in facial engagement therewith, said skirt portion terminating adjacent said shank in a radially outwardly extending flared flange of greater diameter than said skirt portion which is in facial engagement with said nut, said flared flange being reversely bent substantially radially inwardly toward said shank portion to provide a flat, annular surface having a plane which is substantially perpendicular to the longitudinal axis of said nut.

2. The capped wheel nut assembly of claim 1 wherein said reversely bent section of said flared flange has its end in engagement with said shank portion.

3. The capped wheel nut assembly of claim 1 wherein the end of said reversely bent section of the flared flange is located radially inward the flat peripheral faces of the nut.

* * * * *